Nov. 1, 1938.　　　　J. S. MANTON　　　　2,135,257
BICYCLE
Filed Jan. 15, 1937　　　　2 Sheets-Sheet 1

Inventor
James S. Manton
By Brown, Jackson, Boettcher & Dienner
Attys

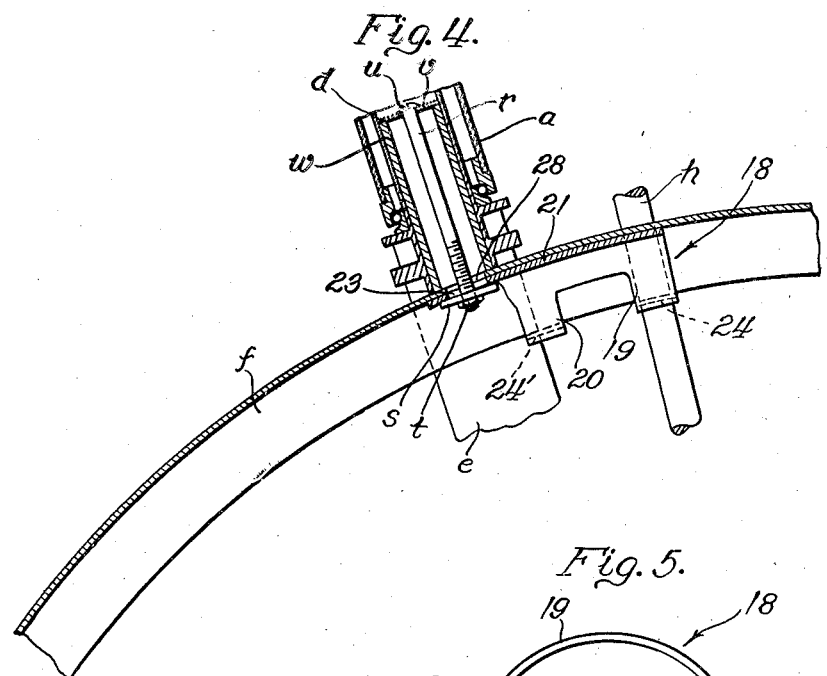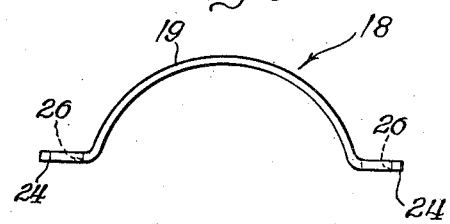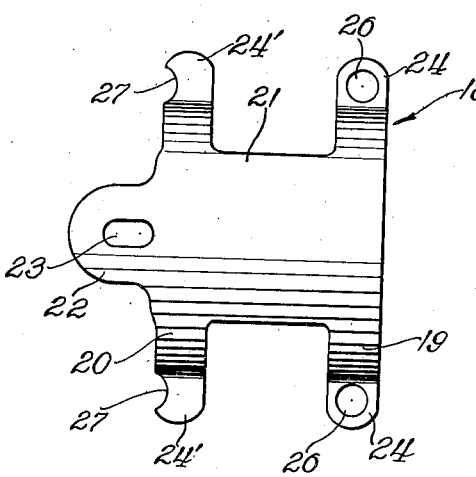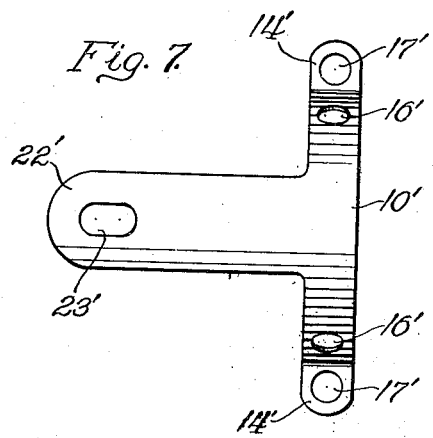

Patented Nov. 1, 1938

2,135,257

UNITED STATES PATENT OFFICE 2,135,257

BICYCLE

James S. Manton, Oak Park, Ill.

Application January 15, 1937, Serial No. 120,760

7 Claims. (Cl. 280—152.1)

My invention relates to bicycles, and has to do with means for bracing the front wheel fork and fender.

My invention is directed to the provision of new and improved bracing means for the front fork and fender of a bicycle, effective to secure such parts rigidly together as a unit and thereby prevent relative movement between them, eliminating objectionable rattling and providing increased strength.

More specifically, one of the objects of my invention is the provision of a new and improved form of bracing means of the character and for the purposes described of simple and inexpensive construction, of adequate mechanical strength and high efficiency.

Other objects of the invention reside in certain features of construction, combinations of elements and arrangements of parts, which will be exemplified in the construction hereinafter described, and which will in part be obvious and in part pointed out.

In describing my invention, reference is had to the accompanying drawings, wherein I have disclosed the preferred physical embodiments of my invention, and in which:

Figure 4 is a fragmentary vertical sectional view through a bicycle head and fender showing a modified form of my invention applied thereto;

Figure 5 is a front view of the fender plate of the modified form of my invention shown in Figure 4;

Figure 6 is a plan view of the plate shown in Figure 5; and

Figure 7 is a plan view of a further modified form of fender plate.

Figure 1:
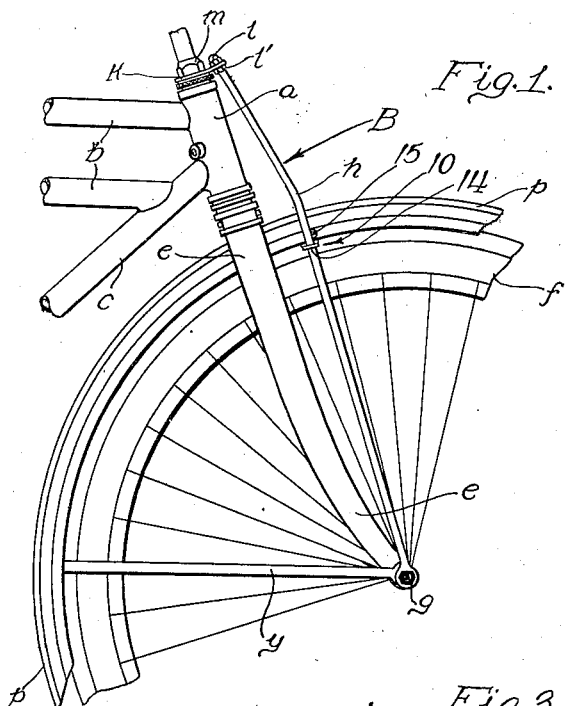
Figure 1 is a fragmentary side view of the front portions of a bicycle showing my invention applied thereto.

Referring now in detail to the drawings, I have disclosed the bracing means of my invention, by way of illustration, as applied to a bicycle B of known construction comprising a tubular head $a$, and upper horizontal bars $b$ and a reach bar $c$, rigidly secured to the head $a$ in a known manner. Head $a$ receives stem $d$ of the fork $e$, within which is suitably mounted front wheel $f$ of the bicycle, as by means of spindle $g$. Truss rods $h$ have their lower ends suitably mounted on spindle $g$ and, at their upper ends, project through openings in a plate $k$, to which they are rigidly secured as by means of the cooperating nuts $l$ and $l'$. Plate $k$ is provided with a central opening for passage of the stem $d$ therethrough, and is confined between a nut $m$ screwing on stem $d$ and a washer $n$, which washer seats on the cone shaped race nut $o$ of a ball bearing structure provided at the upper end of head $a$, as is usual. A fender $p$ is disposed between the legs of fork $e$ and connected to head $a$, as by means of bolt $r$ (Figure 4), the lower end of this bolt passing through an opening in the fender and being provided with a fender abutting washer $s$ and a nut $t$. Bolt $r$ extends upwardly into head $a$ for an appreciable distance, and the head $u$ of the bolt seats on the upper surface of a washer $v$, which washer in turn seats on the upper end of a bushing $w$, rigidly secured in stem $d$ in any suitable or preferred manner. The rear end of the fender is braced by means of a U-shaped member $y$, straddling wheel $f$ and mounted at its forward end on spindle $g$, in a known manner. The rear portions of the brace member is secured to the fenders, in any suitable or preferred manner.

A steel strap 10 shaped to conform substantially to the under surface of the fender $p$ is mounted upon the latter. Strap 10 comprises a substantially horizontally disposed central portion 11, outwardly and downwardly inclined portions 12 and 13, and substantially horizontal end portions 14 or tabs projecting beyond the sides of the fender. Screws 15 passing through the fender, thread through portions 13 of the strap and serve to secure it rigidly to the fender. Openings 17, in tabs 15 snugly receive truss rods $h$ and rigidly connect them to the fender through the strap. Since the fender is rigidly secured to post or stem $d$ of fork $e$, and is also rigidly secured to truss rods $h$, the fork, fender and truss rods are secured together as a unit and held against objectionable relative movement, eliminating looseness and rattling of parts.

In the modified form shown in Figures 4 to 6, inclusive, a plate 18 is disposed at the under side of the fender and comprises a pair of straps 19 and 20 at the ends of a bridge portion 21, and a tongue 22 projecting rearward from portion 21, centrally thereof, and provided with a centrally disposed longitudinal slot 23.

Plate 18, including straps 19 and 20, is shaped conformably to the under face of the fender $p$. Straps 19 and 20 are bent upward, intermediate their ends, to provide horizontally disposed end portions or tabs 24 and 24', respectively. Tabs 24 of straps 19 are provided with openings 26, and tabs 24' of straps 20 are provided with rearwardly opening arcuate notches 27.

Figure 2:
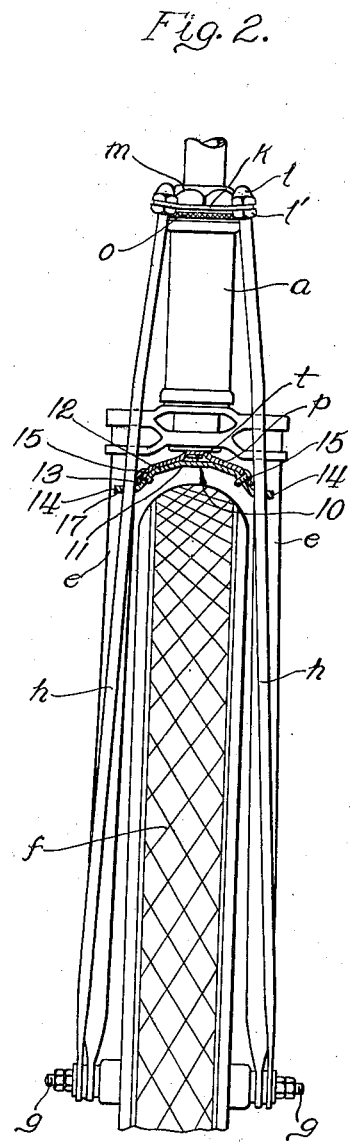
Figure 2 is a fragmentary front view of the construction shown in Figure 1, parts being shown in vertical section.
Figure 3:
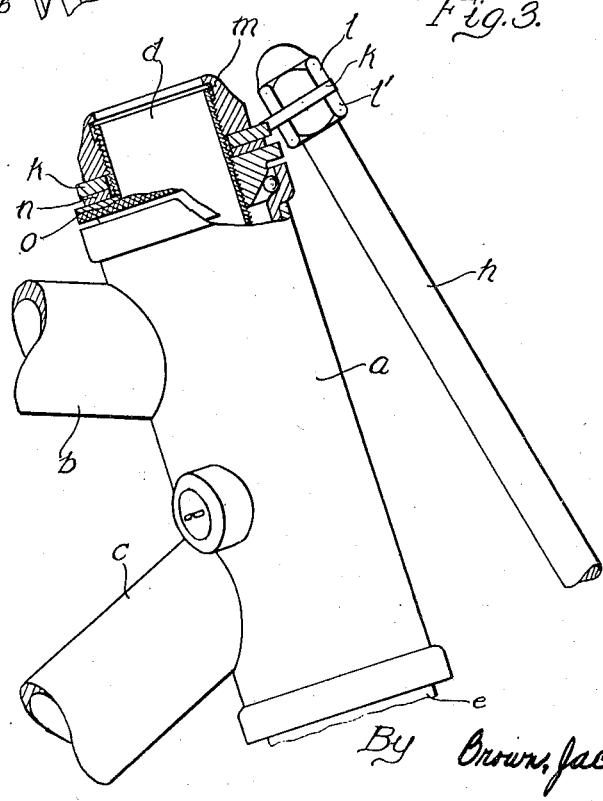
Figure 3 is an enlarged fragmentary side view of the bicycle head, parts being broken away and parts being shown in vertical section.

Plate 18 is disposed in abutting engagement with the undersurface of fender p, and with slot 23 of tongue 22 in register with a slot 28 formed in the fender. Bolt r extends through both of these slots, and the plate 18 is firmly secured to the fender by the washer s and nut t mounted upon the bolt. Truss rods h pass upwardly through openings 26 in tabs 24, and the notches 27 of tabs 24' receive the forward marginal edges of the legs of fork e. The abutment of tabs 27 with the legs of the fork prevents downward movement of the forward end of plate 18 from fender p, and it is not necessary, therefore, to drill either the fender or strap 19 for the reception of bolts, as is necessary in Figure 2, although this may be done, if so desired. Strap 18 provides for a more rugged and rigid support between bolt r and truss rods h than in the case of strap 10 of Figures 1 to 3, where such support is the function of the portion of the fender between the bolt and the truss rods.

The fender plate of Figure 7 comprises the strap 10', having the openings 16' for securing means, and horizontal end portions or tabs 14', provided with the openings 17' for reception of the truss rods h. The strap is provided with a tongue 22' slotted at 23'. Strap 10' may be secured to the fender in the same manner as strap 10 of Figure 2, while tongue 22' is secured to bolt r in the same manner as tongue 22 of Figure 4.

While preferred embodiments of my invention have been illustrated and described, by way of example, it will be obvious that changes may be made therein within the spirit and scope of the invention and, therefore, the invention is not to be limited to the precise forms herein disclosed, except insofar as it may be so limited in the appended claims.

I claim:

1. In a bicycle, the combination with a front fork, a spindle and a stem carried at opposite ends of said fork, truss rods connecting said spindle and said stem, and a fender connected to said stem, of a strap spaced forwardly of said fork and rearwardly of the forward edge of said fender and connecting said fender to said truss rods, whereby the strap and the portion of the fender between said strap and said stem constitute a support for said truss rods at a point intermediate their length.

2. In a bicycle, the combination with the front fork, a spindle and a stem carried at opposite ends of said fork, truss rods connecting said spindle and said stem, and a fender associated with said stem and fork, of a strap having its intermediate portion shaped to conform with the curvature of said fender and its end portions disposed substantially horizontally, said strap being disposed in abutting engagement with the inner surface of said fender and with its horizontal end portions projecting outwardly beyond the marginal edges of said fender, the end portions of said strap having openings for passage of said truss rods therethrough, whereby said strap will be disposed intermediate the ends of said rods, and means securing said strap to said fender.

3. In a bicycle the combination with a front fork, a spindle and a stem carried at opposite ends of said fork, truss rods connecting said spindle and said stem, and a fender associated with said stem and fork, of a strap associated with said fender and connected to said truss rods, said strap including means associated with said stem, and means connecting said fender and said last named means to said stem.

4. In a bicycle the combination with a front fork, a spindle and a stem carried at opposite ends of said fork, truss rods connecting said spindle and said stem, and a fender associated with said stem and fork, of bracing means associated with said fender and comprising a strap connected to said truss rods and a second strap abutting said fork, said second strap including a member disposed below said stem, and means connecting said fender and said member to said stem.

5. In a bicycle the combination with a front fork, a spindle and a stem carried at opposite ends of said fork, truss rods connecting said spindle and said stem, and a fender associated with said stem and fork, of bracing means associated with said fender and comprising a pair of spaced straps integrally secured to an interposed bridge portion, one of said straps being provided with openings receiving said truss rods, and the other of said straps engaging the legs of said fork, a tongue formed integrally with the marginal edge of one of said straps and projecting therefrom to a point adjacent said stem, and means connecting said fender and said tongue to said stem.

6. In a bicycle the combination with a front fork, a spindle and a stem carried at opposite ends of said fork, truss rods connecting said spindle and said stem, and a fender associated with said stem and fork, of bracing means associated with said fender and comprising a pair of spaced straps integrally secured to an interposed bridge portion, one of said straps being provided with openings receiving said truss rods, and the other of said straps engaging the legs of said fork, a tongue formed integrally with the marginal edge of one of said straps and projecting therefrom to a point adjacent said stem, said tongue being provided with a slot, a bolt confined within said stem and projecting through said fender and the slot in said tongue, and means carried by said bolt and clamping said fender and said tongue between such means and said stem.

7. As an article of manufacture, a bracing member comprising a pair of spaced straps, an interposed bridge portion, and a tongue projecting from one of said straps, said member being bent to provide a pair of straps each having a curved intermediate portion and substantially horizontally disposed end portions, the end portions of one of said straps being provided with openings, and the marginal edges of the other of said straps being notched out, and said tongue being provided with a slot.

JAMES S. MANTON.